(12) United States Patent
Breznak et al.

(10) Patent No.: US 7,057,324 B2
(45) Date of Patent: Jun. 6, 2006

(54) SILICON STEEL PUNCHING ORIENTATION MODIFICATIONS TO LOWER EDDY CURRENT LOSSES AT THE STATOR CORE END OF DYNAMOELECTRIC MACHINES

(75) Inventors: Jeffrey M. Breznak, Waterford, NY (US); Sameh Ramadan Salem, Rexford, NY (US)

(73) Assignee: General Electric Company, Schnectady, NY (US)

( * ) Notice: Subject to any disclaimer, the term of this patent is extended or adjusted under 35 U.S.C. 154(b) by 136 days.

(21) Appl. No.: 10/322,426

(22) Filed: Dec. 19, 2002

(65) Prior Publication Data

US 2004/0119365 A1 Jun. 24, 2004

(51) Int. Cl.
*H02K 1/16* (2006.01)

(52) U.S. Cl. .................. 310/216; 310/217; 310/218
(58) Field of Classification Search ............. 310/216, 310/217, 256, 218
See application file for complete search history.

(56) References Cited

U.S. PATENT DOCUMENTS 4,672,252 A * 6/1987 Spirk .................... 310/216

* cited by examiner

*Primary Examiner*—Dang Le
*Assistant Examiner*—Iraj A. Mohandedsi
(74) *Attorney, Agent, or Firm*—Nixon & Vanderhye P.C.

(57) ABSTRACT

The invention involves orienting the metal laminations that form a stator core end in such a way so as to reduce eddy current losses in the finger portions of the metal laminations. The metal laminations are positioned so that the grain orientation is parallel to the magnetic flux lines generated in the finger portions.

8 Claims, 2 Drawing Sheets

SILICON STEEL PUNCHING ORIENTATION MODIFICATIONS TO LOWER EDDY CURRENT LOSSES AT THE STATOR CORE END OF DYNAMOELECTRIC MACHINES

FIELD OF THE INVENTION

The invention is directed to reducing the electromagnetic flux normal to the stator core-end that causes eddy current losses and heating in dynamoelectric machines.

BACKGROUND OF THE INVENTION

There have been a number of ways proposed in the prior art for reducing this harmful electromagnetic flux. For example, increasing the air-gap length towards the end of the stator core reduces such core end flux. Reducing the relative axial length of the rotor with respect to the stator is another way to reduce the core end fringing flux. In addition, core-end stepping has been one of the commonly used techniques to modify the air-gap length in the core-ends to reduce the core end flux.

The amount of core-end stepping that can be used is limited, however, by the need to support the lamination "teeth" from flexing. Loose lamination teeth can flutter and break off causing machine failure.

All of these proposals for reducing the electromagnetic flux normal to the stator core-end that causes eddy current losses and heating in dynamoelectric machines also increase the excitation needs contributing to lower efficiencies and potentially a bigger thermal challenge.

SUMMARY OF THE INVENTION

In order to overcome the deficiencies of the prior art described above, the invention proposes that a percentage, up to 100%, of the grain oriented silicon steel laminations be punched so that the finger sections of the laminations would be oriented in an optimum direction to reduce eddy current losses. This optimum orientation should preferably be used for up to the outer 20" of each end of the stator core.

The core end is the area where the finger sections (teeth) suffer from the heating caused by eddy currents. In this invention the finger sections of silicon steel laminations are placed such that the majority of the flux follows the grain and MMF drop is minimized.

The use of oriented magnetic steel such that the peripheral direction of magnetic flux in the finger sections is parallel to the preferred grain direction also increases the allowable flux density in the core end.

The reduction of losses and heating, especially in the stator core-ends increases the potential to uprate electric machines by partially re-stacking the core-end laminations without sacrificing reliability, efficiency, or performance of the machine. Of course this advancement would also help further optimize new machine manufacture, production, operation and design.

For example, generator power output is limited by significant heat buildup on the extreme ends of the generator field due to high eddy current losses. The flux associated with the field induces eddy currents in the stator teeth, and penetrates several inches into the stator core.

The heating caused by the eddy currents is a limiting factor in the design of large generators or electric machines. In addition, the axial fluxes add onto the normal radial fluxes in the end packages, increasing the level of saturation in the end teeth and yoke. The effect of reducing radial flux entering the first and second packages is to lower the level of saturation in these packages, enabling the axial flux to turn radially closer to the core end.

The resultant effect is to lower the axial flux densities and, therefore, the iron temperatures. Accordingly, the invention improves efficiency and allows for the up rating of large generator or electric machines by lowering eddy current losses and reducing the temperature at the core-end.

As noted above, this optimum orientation of the silicon steel laminations should preferably be used for up to the outer 20" of each side of the generator field. The greater efficiency will result in less temperature buildup and, therefore, the entire generator field can be operated at a higher induction. The higher induction will in turn increase the energy output of the generator.

A key objective of the invention is to reduce losses and heating, especially in the generator or motor core-ends without sacrificing reliability, efficiency, and performance of the machine. This increases the potential to uprate electric machines by partially re-stacking the core-end laminations. This advancement, however, also has application in further optimizing new machines.

DETAILED DESCRIPTION OF THE INVENTION

The magnetic steel used by some electric machine manufacturers is not only nonlinear, but also anisotropic. This means that there is a grain direction in the steel. Along the grain permeability is increased, whereas, across the grain permeability is decreased.

Figure 1:
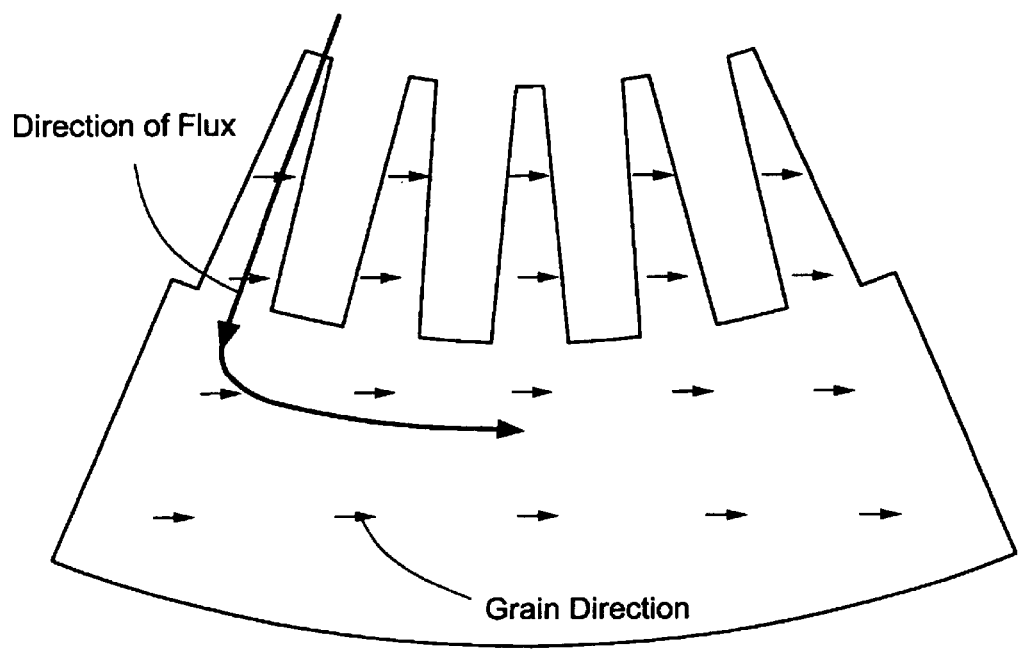
FIG. 1 shows core end laminations in which the direction of the flux lines in the finger portions of the laminations are perpendicular to the grain direction of the laminations.

The prior art laminations are oriented such that the peripheral direction of the flux in the yoke is parallel to the preferred grain direction, as shown in FIG. 1. Magnetic losses are lowest when the flux flows parallel to the direction of grains (the easy direction).

However, when the flux is perpendicular to the texture (e.g. in the teeth), the losses can be as much as three times higher as those obtained when parallel (0.68 W/lb vs. 1.7 W/lb). The core end is the area where the teeth suffer from the heating caused by impinging core-end flux.

Figure 2:
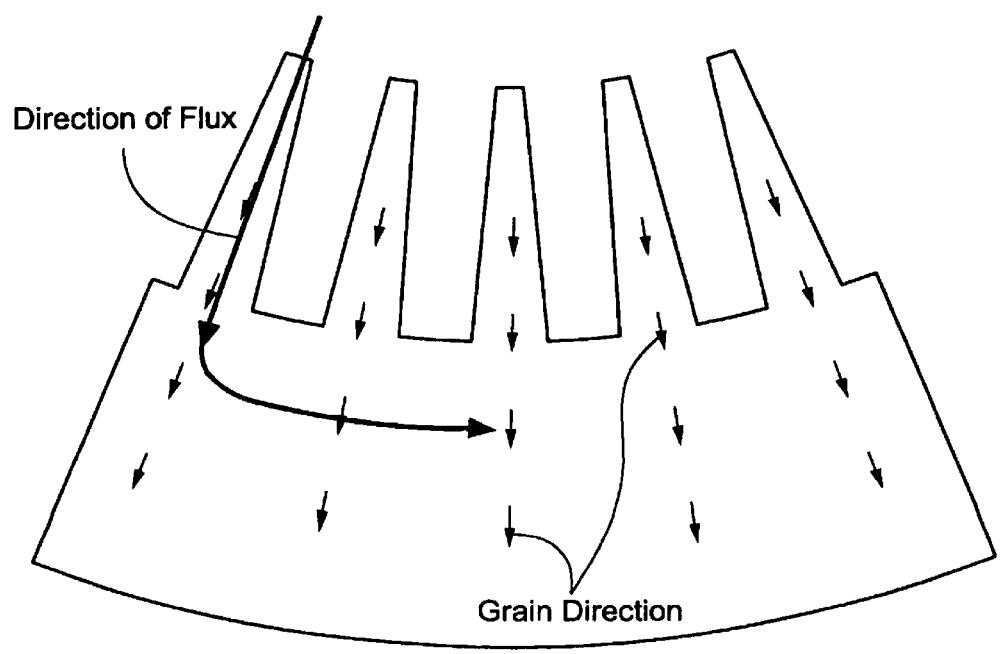
FIG. 2 shows core end laminations in which the direction of the flux lines in the finger portions of the laminations are parallel to the grain direction of the laminations.
Figure 3:
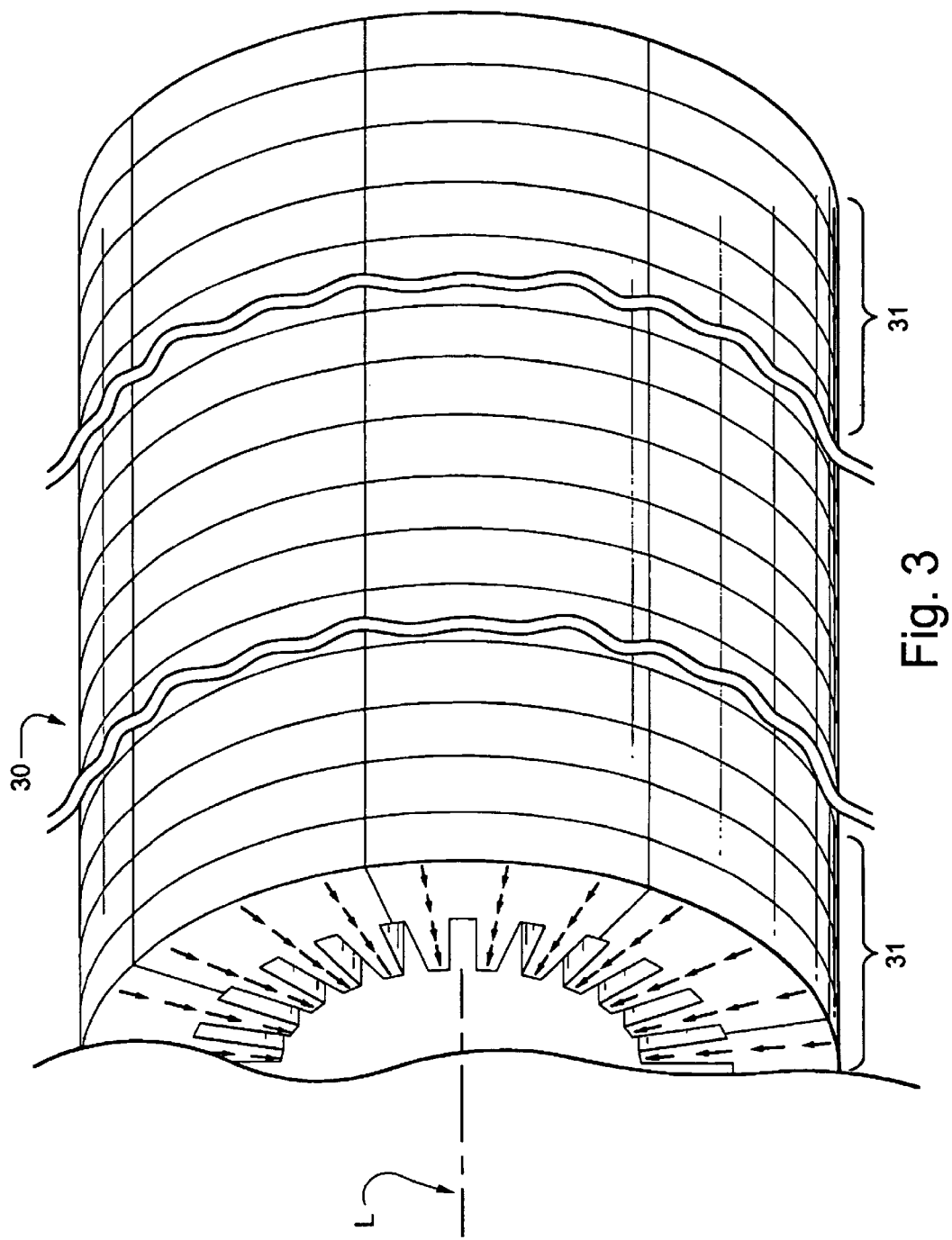
FIG. 3 shows the outer ends of the stator core along the longitudinal axis having the core end laminations shown in FIG. 2.

In the invention, the use of oriented magnetic steel such that the peripheral direction of flux in the teeth is parallel to the preferred grain direction, as shown in FIG. 2, increases the allowable flux density in the core end stator teeth. Preferably, 100% of the out most silicon steel laminations (up to 20") will be punched in this parallel optimum orientation that will minimize eddy current losses. FIG. 3 shows the outer ends 31, 31 of stator core 30 comprised of the silicon steel laminations, shown in FIG. 2, along longitudinal axis "L."

After the laminations are punched in the preferred orientation, the laminations packs and generator field will be assembled using current manufacturing processes. The reduction of losses and heating, especially in the generator or motor core-ends increases the potential to uprate electric machines by partially re-stacking the core-end laminations without sacrificing reliability, efficiency, or performance of the machine. This advancement would also help further optimize new machine design.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Stator core ends located along the longitudinal axis of a dynamoelectric machine being formed from magnetic metal laminations with both finger and yoke portions and being formed so that only the magnetic metal laminations of the stator core ends have a grain orientation in the finger portions optimized to reduce eddy current losses.

2. Stator core ends of a dynamoelectric machine as claimed in claim 1, wherein said optimized grain orientation extends for about 20" at each stator core end of a stator core, in the axial directions along the length of the stator core.

3. Stator core ends of a dynamoelectric machine as claimed in claim 1, said optimized grain orientation in said finger portions being parallel to magnetic flux lines generated in said finger portions.

4. Stator core ends of a dynamoelectric machine as claimed in claim 2, said optimized grain orientation in said finger portions being parallel to magnetic flux lines generated in said finger portions.

5. A method of forming stator core ends located along the longitudinal axis of a dynamoelectric machine from magnetic metal laminations having both finger and yoke portions, said method comprising only forming the stator core ends with the magnetic metal laminations having a grain orientation in the finger portions to reduce eddy current losses.

6. A method as claimed in claim 5, said grain orientation extending for about 20" at each end of a stator core in the axial directions along the length of the stator core.

7. A method as claimed in claim 5, said grain orientation in said finger portions being parallel to magnetic flux lines generated in said finger portions.

8. A method as claimed in claim 6, said grain orientation in said finger portions being parallel to magnetic flux lines generated in said finger portions.

* * * * *